United States Patent [19]

Ono

[11] Patent Number: 5,069,719

[45] Date of Patent: Dec. 3, 1991

[54] ORGANIC SOLVENT BASED INK COMPOSITION

[75] Inventor: Takashi Ono, Takatsuki, Japan

[73] Assignee: Orient Chemical Industries, Ltd., Osaka, Japan

[21] Appl. No.: 631,465

[22] Filed: Dec. 21, 1990

[51] Int. Cl.$^5$ .................. C09D 11/00; C09D 31/00; C09B 27/00

[52] U.S. Cl. .................... 106/22; 106/147; 106/497; 534/618; 534/583; 534/727; 568/14; 552/209

[58] Field of Search .............. 106/22, 147, 497; 534/618, 583, 727; 568/14; 552/209

[56] References Cited

U.S. PATENT DOCUMENTS

| | | | |
|---|---|---|---|
| 4,091,021 | 5/1978 | Andrew et al. | 534/583 |
| 4,727,127 | 2/1988 | Suzuki | 106/2 |
| 4,872,916 | 10/1989 | Latosky | 106/497 |
| 4,878,946 | 11/1989 | Takayashi et al. | 106/22 |

FOREIGN PATENT DOCUMENTS

| | | | |
|---|---|---|---|
| 1230673 | 10/1988 | Japan | 552/209 |
| 1241102 | 7/1971 | United Kingdom | 552/209 |

*Primary Examiner*—William R. Dixon, Jr.
*Assistant Examiner*—T. D. Saunders
*Attorney, Agent, or Firm*—Birch, Stewart, Kolasch & Birch

[57] ABSTRACT

Disclosed is an organic solvent based ink composition which contains a specific dye and an organic solvent, especially an alcohol or a glycol and which has excellent stability with time and good writing properties. The organic solvent based ink composition comprises a dye and an organic solvent, wherein the dye is represented by

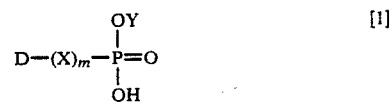

wherein D represents a residue of an azo or anthraquinone dye which does not have a sulfone group and a carboxyl group, X represents an oxygen atom or a methylene group, Y represents a $C_2$–$C_{12}$ alkyl group, a $C_2$–$C_4$ hydroxyalkyl group, a $C_2$–$C_{12}$ alkoxyalkyl group, a polybutyral residue, a polyvinyl alcohol residue, a phenol resin residue, or a cellulose residue and m shows 0 or 1.

9 Claims, No Drawings

ORGANIC SOLVENT BASED INK COMPOSITION

FIELD OF THE INVENTION

The present invention relates to an organic solvent based ink composition which comprises a specific dye and an organic solvent (e.g. alcohols and glycols). The ink composition has excellent stability with time.

BACKGROUND OF THE INVENTION

Hitherto, an organic solvent based ink for a ball point pen or a marker pen generally contains an organic solvent and a solvent dye which is listed in color index. The organic solvent has been changed from an aromatic solvent to an alcohol and a glycohol because of toxicity, air pollution and the like. However, only a few solvent dyes have high solubility with the alcohol and glycol and it is therefore very difficult to formulate various kind of inks.

There also proposed three kinds of dye, i.e. a dye which is color-developed by adding an organic acid to a leuco base of a basic dye, a dye which is prepared by salt-forming a base of the basic dye with an acidic dye and a dye which is prepared by forming an amine salt from the acid dye. They, however, do not have sufficient solubility in the alcohol and glycol, especially propyl alchol and propylene glycol which are less toxic. They are also poor in stability with time in the alcohol and glycol.

An organic solvent based ink which employs a pigment as colorant is also known to the art. Since the pigment inherently is not compatible with the organic solvent or a binder resin, the pigment must be ground with the binder resin or the solvent and dispersed in the ink. The pigmented ink, however, does not have stability with time and often forms agglomerates and precipitates.

SUMMARY OF THE INVENTION

The present invention provides an organic solvent based ink composition which contains a specific dye and an organic solvent, especially an alcohol or a glycol, and which has excellent stability with time and good writing properties. The organic solvent based ink composition comprises a dye and an organic solvent, wherein the dye is represented by

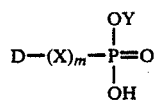
[1]

wherein D represents a residue of an azo or anthraquinone dye which does not have a sulfone group and a carboxyl group, X represents an oxygen atom or a methylene group, Y represents a $C_2$-$C_{12}$ alkyl group, a $C_2$-$C_4$ hydroxyalkyl group, a $C_2$-$C_{12}$ alkoxyalkyl group, a polybutyral residue, a polyvinyl alcohol residue, a phenol resin residue, or a cellulose residue and m shows 0 or 1.

DETAILED DESCRIPTION OF THE INVENTION

The dye [I]may be obtained by esterifying a dye (herein "phosphoric dye" represented by

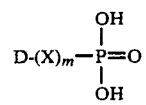
[2]

wherein D, X and m are the same as mentioned above, with an alcohol, a glycol monoether, a polybutyral, polyvinyl alcohol, polyphenol resin or a cellulose. The phosphoric dye is known to the art and listed in various documents.

Typical examples of the dyes [1]are

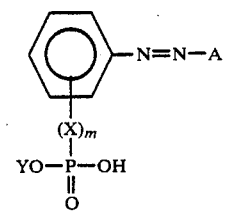
[a]

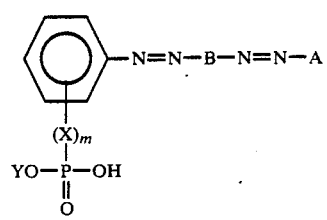
[b]

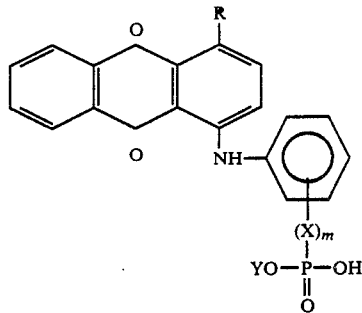
[c]

wherein X, Y and m are the same as mentioned above, A represents a residue of a coupling component which does not have a sulfone group or a carboxyl group, B represents a phenylene group or a naphthylene group which may be substituted with a $C_1$-$C_2$ alkyl group (e.g. a methyl group or an ethyl group), a $C_1$-$C_2$ alkoxy group (e.g. a methoxy group or an ethoxy group) and-/or a hydroxyl group, R represents a hydroxyl group, an amino group or a methylamino group.

The compound [a] is a phosphate of a phosphoric monoazo dye of which a diazo component is aminobenzenephosphonic acid. The compound [b] is a phosphate of a phosphoric disazo dye of which a diazo component is a monoazo dye represented by

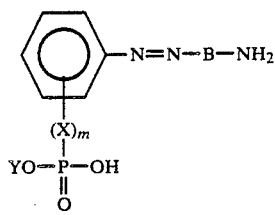

[b']

The group A is a residue of a coupling component which is employed at the time of the synthesis of the azo dye and which does not contain a sulfone group and a carboxyl group. The coupling component includes phenols, naphthols, pyrazolone derivatives, pyrazole derivatives, acetoacetic anilide derivative, perimidine derivatives, phenylenediamine, 3-carbamoyl-4-methyl-6-hydroxy-N-butylpyridone and the like. Typical examples of the coupling components are 3-methyl-1-phenyl-5-pyrazolone, 5-amino-3-methyl-1-phenylpyrazole, beta-naphthol, 1-amino-7-naphthol, 1-amino-5-naphthol, phenol, resorcin, (o-, m- or p-)aminophenol, p-phenylphenol, m-phenylenediamine, acetoacetic anilide, perimidine and 3-carbamoyl-4-methyl-6-hydroxy-n-butylpyridone and the like. In the compound [b], —B— is introduced from, for example, cresamine, cresidine, (o-, m-, or p-)phenetidine, (o-, m-, or p-)anisidine, 2,5-dimethoxyaniline, (o-, m- or p-)aminophenol, (o-, m-, or p-toluidine, p-xylindine, 2,4-xylidine, 8-amino-2-naphthol, naphthylamine and the like.

The compound [c] is a phosphate of a phosphoric anthraquinone dye which is prepared by reacting an anthraquinone derivative (e.g. 1-amino-4-bromoanthraquinone) with 3-aminobenzenephosphonic acid.

The group Y of the dye [1] of the present invention, as described above, is introduced from a $C_2$–$C_{12}$ alcohol, a $C_2$–$C_4$ glycol, a $C_2$–$C_{12}$ glycol monoalkyl ether, a polybutyral, a polyvinyl alcohol, a phenol resin or a cellulose. Typical examples of the $C_2$–$C_{12}$ alcohols are ethyl alcohol, propyl alcohol, amyl alcohol, hexyl alcohol, octyl alcohol, nonyl alcohol, benzyl alcohol and a $C_{10}$–$C_{12}$ higher alcohol. Typical examples of the $C_2$–$C_{12}$ glycols are ethylene glycol, propylene glycol and butylene glycol. Typical examples of the $C_2$–$C_{12}$ glycol monoalkyl ethers are ethyleneglycol monoethyl ether, propyleneglycol monoethyl ether and ethyleneglycol monophenyl ether. The introduction of the alcohol, glycol and glycol monoalkyl ether may be conducted by reacting them with the unesterified dye at 100° to 150° C. in the presence of a basic catalyst (e.g. phosphoric guanidine, dicyanediamide, cyanamide and amidinothiourea). The introduction of the other polymers may be conducted by reacting them with the unesterified dye at 100° to 150° C. in the presence of the above basic catalyst in an organic solvent (e.g. 1,3-dimethyl-2-imidazolidinone, dimethylformamide and formamide).

Typical examples of the dyes [1] are

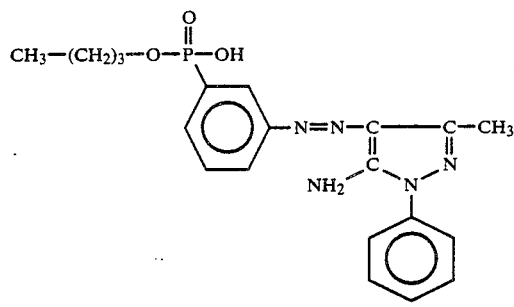

Compound 1 (yellow)

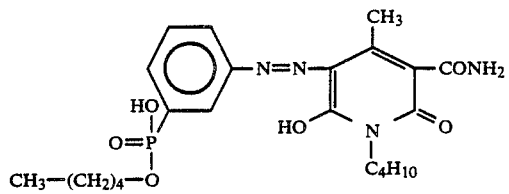

Compound 2 (yellow)

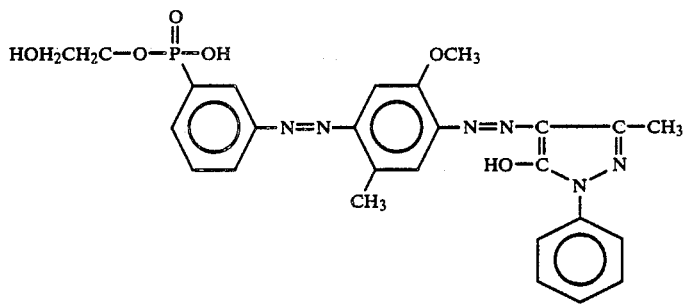

Compound 3 (orange)

-continued
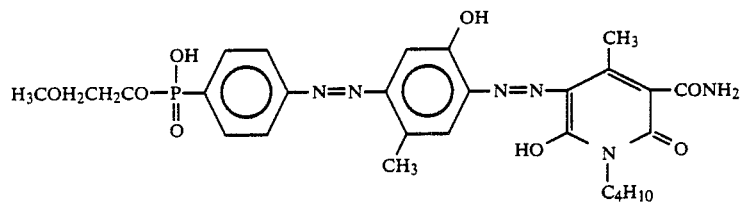
Compound 4 (orange)
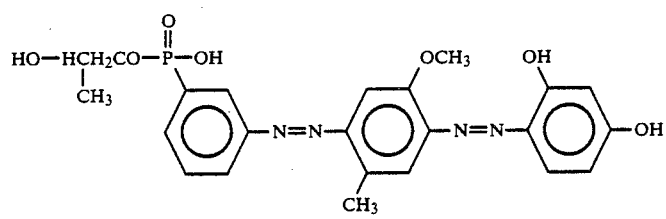
Compound 5 (red)
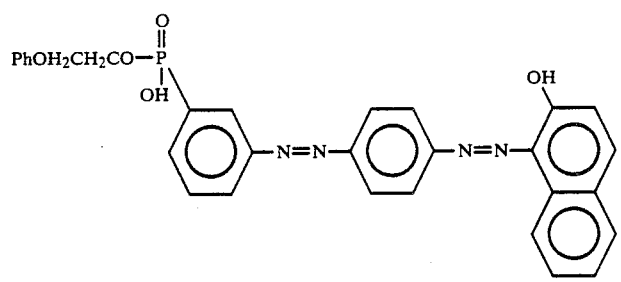
Compound 6 (red)
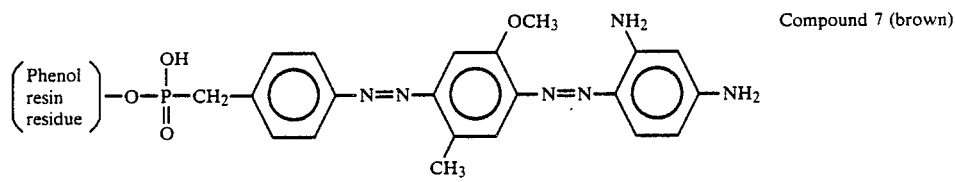
Compound 7 (brown)
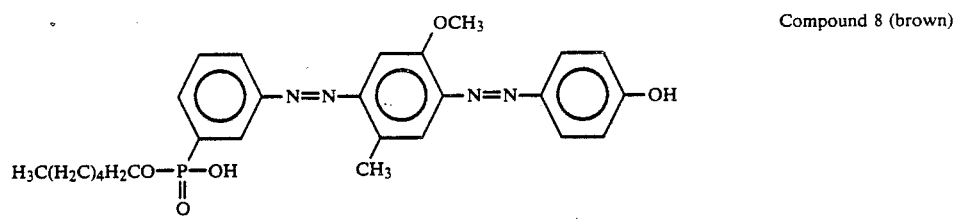
Compound 8 (brown)
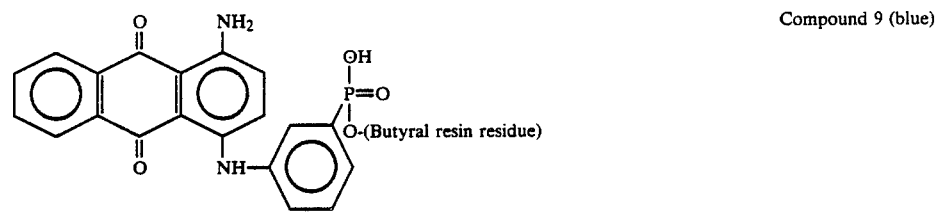
Compound 9 (blue)
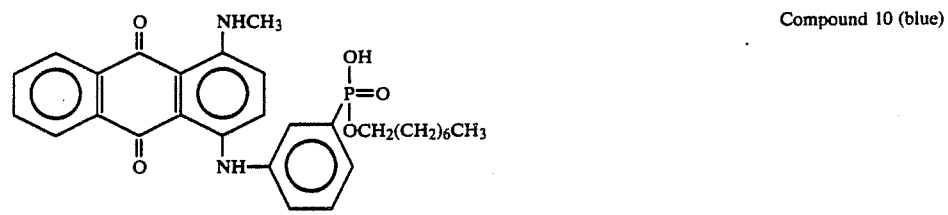
Compound 10 (blue)

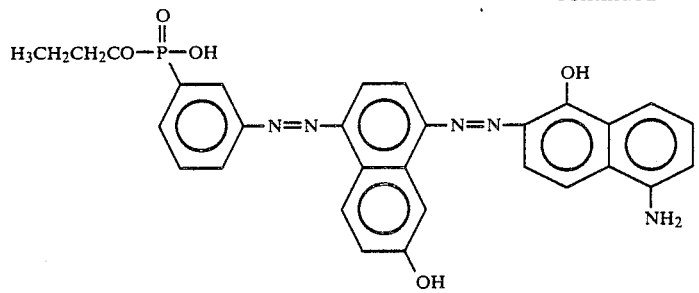

Compound 11 (blue)

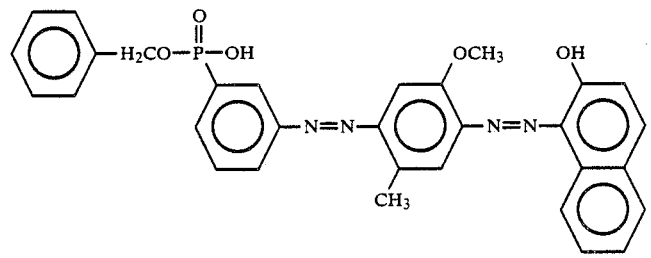

Compound 12 (purple)

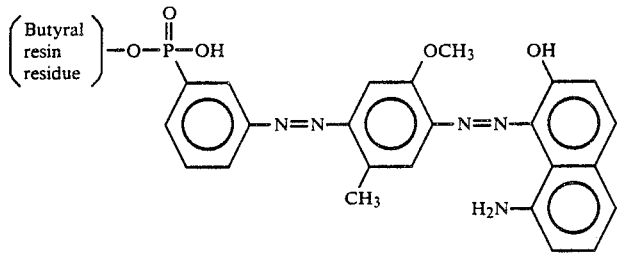

Compound 13 (black)

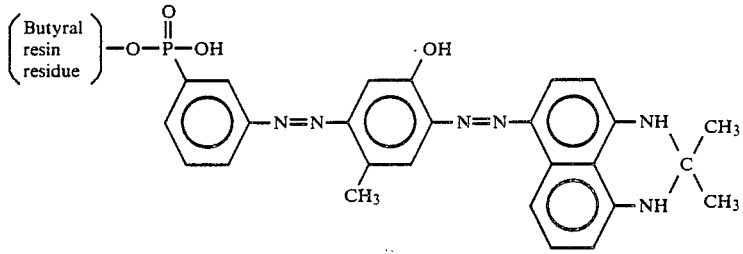

Compound 14 (brack)

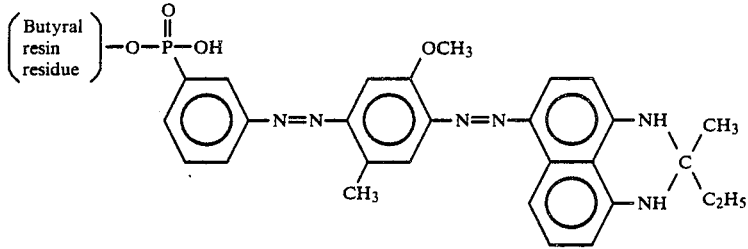

Compound 15 (black)

The dye [1] may be employed solely or in combination. An amount of the dye [1] is not limited and varied by a use application of the obtained ink, but generally within the range of 8 to 20 % by weight (preferably 10 to 15 % by weight) for ball point pens, 3 to 15 % by weight (preferably 5 to 10 % by weight) for maker pens.

The ink composition of the present invention generally contains the dye [1] and an organic solvent, especially an alcohol or a glycol. It may further contain a binder resin which is dissolved in or compatible with the organic solvent. Typical examples of the organic solvents are monohydric alcohols (e.g. methanol, ethanol, propanol and benzyl alcohol), polyhydric alcohols (e.g. ethylene glycol, diethylene glycol, triethylene glycol, tetraethylene glycol, glycerine, propylene glycol and dipropylene glycol), hydroxy ethers (e.g. monomethyl ether, ethyleneglycol monoethyl ether, diethyleneglycol monomethyl ether, diethyleneglycol monoethyl ether, diethyleneglycol monobutyl ether, propyleneglycol monomethyl ether, propyleneglycol monoethyl ether and ethyleneglycol monophenyl ether), esters of hydroxy ethers (e.g. ethyleneglycol monomethyl ether acetate and diethyleneglycol monoethyl ether acetate), formamide, N,N-dimethylformamide, dimethylsulfoxide, N-methyl-2-pyrrolidone, 1,3-dimethyl-2-imidazolidinone and the like. Typical examples of the binder resins are phenol resin, ketone resin, sulfoamide resin, polyvinylbutyral, polyvinyl alcohol, polyethylene glycol, cellulose resin and the like.

The organic solvent based ink composition of the present invention may further contain an additive, such as a surfactant, a wetting agent, a viscosity modifier, a pH controller, an anticorrosive agent, a release agent and the like, in order to improve the qualities of the obtained ink. Preferred surfactants are nonionic surfactants, such as fluorine-containing surfactants (available from Daikin Industries, Ltd. as Unidainne DS-401 and DS-402 and Dainippon Ink and Chemicals, Inc. as Megafac F-1420 and F-177), silicon-containing surfactants (available from Nippon Unicar, Co., Ltd. as Silicon L-7607) and phosphorate surfactants (available from Daiichi Kogyo Seiyaku Co., Ltd. as Plysurp A 208 S), and the like. Typical examples of the wetting agents are polyalkylene glycols (e.g. polyethylene glycol and polypropylene glycol), alkylene glycols (e.g. ethylene glycol, propylene glycol, butylene glycol and hexylene glycol), ethyleneglycol monoalkyl ether (e.g. ethyleneglycol monomethyl ether and ethyleneglycol monoethyl ether) and glycerine. Typical examples of the viscosity modifiers are polyvinyl alcohol and polyvinyl pyrrolidone. Typical examples of the pH controllers are lower alkanolamindes (e.g. ethanolamine, diethanolamine and propanolamine). Typical examples of the anticorrosive agents are benzotriazol.

In a preferred embodiment of the present invention, the group Y of the dye [1] has a similar chemical structure with the organic solvent or the binder resin, in view of the solubility, compatibility and stability with time of the obtained ink. For example, when the composition is employed as alcoholic maker ink, it is preferred that the group Y is a residue of the alcohol. When it is employed as ball point pens, it is preferred that the group Y is a residue of the glycol or glycol monoether. When it is employed as marker ink for writing boards, the group Y is a residue of polybutyral resin which has a hydroxyl group content of 20 to 50 wt %. If the hydroxyl group is less than 20 wt %, the reactivity with the unesterified dye lower. If the hydroxyl group is more than 50 wt %, solubility with alcohols is deteriorated. The marker ink for writing boards preferably contains an organic solvent (e.g. an alcohol having a relatively lower boiling point), a release agent (e.g. nonvolatile or hardly volatile liquid which has a high vapor pressure than the solvent, concretely higher fatty acid esters, phthalic esters, ethyleneglycol higher alkyl ethers, diethyleneglycol higher alkyl ether, higher alcohol and liquid parafin), can sugar esters and a surfactant.

Since the dye [1] has excellent solubility with alcohols and glycols, the composition of the present invention can be used as alcoholic ink. The ink composition also has excellent stability with time. It therefore is suitable as ink for ball point pens, alcoholic maker pens, writing utensils, printing and stamping. If the ink composition is employed as an alcoholic marker ink for writing boards, the erasing ability of the written traces on the writing board is significantly enhanced. The ink composition has higher stability with time than the conventional pigmented marker ink for writing boards has.

EXAMPLES

The present invention is illustrated by the following examples which, however, are not construed as limiting the present invention to their details.

Synthesis of dye

Preparation Example 1

First of all, 20.8 g (0.12 mol) of 3-aminobenzenephosphonic acid was dispersed in a solution of 100 ml of water and 18 g of hydrochloric acid and cooled to 0° C., to which 8.5 g of sodium nitrite was added for diazotization. The resultant mixture was added slowly to a solution of 20.8 g (0.12 mol) of 5-amino-3-methyl-1-phenylpyrazol, 300 ml of water and 16 g of hydrochloric acid, and mixed for 3 hours at pH 8.0 to 8.5 at 5 to 10° C. The mixture was filtered, rinsed with water and dried to obtain a yellow monoazo compound of 40.6 g.

Next, 18.0 g (about 0.05 mol) of the monoazo compound was dispersed in 150 g of n-butanol, to which 2 g of ammonia was added and 20 g (0.24 mol) of dicyandiamide was then added. The solution was heated to reflux and mixed until the reaction was terminated. Water was added thereto and rinsed several times, and an obtained dye[1] was extracted from the upper oil layer. The dye (Compound 1) was dried to form powder of 20 g.

Preparation Example 2

First of all, 20.8 g (0.12 mol) of 3-aminobenzenephosphonic acid was dispersed in a solution of 100 ml of water and 18 g of hydrochloric acid and cooled to 0° C., to which 8.5 g of sodium nitrite was added for diazotization. To the resultant mixture, a solution of 16.3 g (0.12 mol) of p-cresidine, 1,000 ml of water and 14 g of hydrochloric acid was added and then 10 g of thiourea was added and mixed for over night. The mixture was filtered, rinsed with water to obtain a wet cake which was then dispersed in 800 ml of water. To the content, 24 g of hydrochloric acid was added and then 10 g of sodium nitrite was added and mixed for 3 hours at 30° to 40° C. to obtain a monoazodiazo solution. Then, 20.8 g of 3-methyl-1-phenyl-5-pyrazolone was dissolved in 300 ml of water and 7 g of sodium hydroxide, to which the monoazodiazo solution was added and mixed for 3 hours at 5° to 10° C. at pH of 8.0 to 8.5. It was then dried, rinsed with water and dried to obtain an orange disazo compound of 60.0 g.

Next, 18.0 g (about 0.05 mol) of the disazo compound was dispersed in 100 g of ethylene glycol, to which 3 g of ammonia was added and 10 g (0.24 mol) of cyanamide was then added. The content was heated to 150°±2° C. and mixed until the reaction was terminated. The reaction mixture was poured in 500 ml of water, and salted out, filtered and dried to obtain 27g of a dye[1] (Compound 3).

Preparation Example 3

First of all, 17.3 g (0.1 mol) of 3-aminobenzenephosphonic acid was dispersed in a solution of 70 ml of water and 8 g of sodium hydroxide and mixed throughout. To the mixture, 8 g of sodim bicarbonate and 16 g (0.04 mol) of 1-amino-4-bromoanthraquinone were added and 0.6 g of copper chloride was then added and mixed at 70° to 75° C. until the reaction was terminated. The resultant mixture was filtered and the filtrate was made acidic to remove excess 3-aminobenzenephophonic acid. Sodium chloride was added to the filtrate and salted out, filtered and dried. It was then purified with alcohol to obtain a blue anthraquinone compound (20 g).

Next, 20 g (about 0.04 mol) of the anthraquinone compound was dispersed in 150 g of 1,3-dimethyl-2-imidazolidinone, to which 3 g of ammonia was added and dispersed. Thereafter, 5 g of bytyral resin (available from Sekisui Chemical Co., Ltd. as S-LEC and 15 g of cyanamide were added and mixed at 110° to 115° C. until the reaction was terminated. The resultant solution was poured in 500 ml of water, and filtered, dried to obtain 30 g of a dye[1] (Compound 9).

Preparation of an ink composition for an alcoholic marker pen

Example 1

The ingredients shown in Table 1 were mixed and dissolved at 50° to 60° C., and then filtered with a No. 2 filter paper to obtain a yellow ink. The ink was evaluated by stability with time and color density of written traces. The results are shown in Table 1. The color phase of the ink is also shown in Table 1.

Example 2

A brown ink was obtained as generally described in Example 1, with the exception that mixing was conducted at 40° C. The ink was evaluated by stability with time and color density of written traces. The results are shown in Table 1. The color phase of the ink is also shown in Table 1.

Example 3

An orange ink was obtained as generally described in Example 1, with the exception that mixing was conducted at 60° to 70° C. The ink was evaluated by stability with time and no precipitations were observed. A marker pen containing the ink was left without its cap for 3 hours and its writing properties were observed. No dry-up was observed and the pen was smoothly written. The stability with time, density of written traces and color phase of the ink are shown in Table 1.

Example 4

A blue ink was prepared from the ingredients shown in Table 1 as generally described in Example 3. The stability with time, density of written traces and color phase of the ink are shown in Table 1.

Preparation of ink composition for an overhead projector marker pen

Example 5

A black ink was prepared from the ingredients shown in Table 1 as generally described in Example 3. The obtained ink was set in a marker container and a writing test was conducted using a commercially available OHP sheet. No dewetting was observed and a transparent and distinctive image was obtained. The stability with time, density of written traces and color phase of the ink are shown in Table 1.

Example 6

A red ink was prepared from the ingredients shown in Table 1 as generally described in Example 3, with the exception that mixing was conducted at 50° to 60° C. The stability with time, density of written traces and color phase of the ink are shown in Table 1.

Example 7

The ingredients shown in Table 1 were mixed at 90° to 95° C. and filtered with diatomaceous earth (available from Showa Chemical Co., Ltd. as #9,000) to obtain a red ink. The obtained ink was set in a pipe of a ball point pen and allowed to stand at 50 ° C. for 2 months at 80 % relative humidity. Thereafter, the pen was subjected to a writing test to find no changes. Also, the precipitation of the dye in the ink in the pipe was not observed. The stability with time, density of written traces and color phase of the ink are shown in Table 1.

Example 8

A blue ink was prepared from the ingredients shown in Table 1 as generally described in Example 7. The stability with time, density of written traces and color phase of the ink are shown in Table 1.

TABLE 1

| | Examples | | | | | | | |
|---|---|---|---|---|---|---|---|---|
| | 1 | 2 | 3 | 4 | 5 | 6 | 7 | 8 |
| Dye (parts by weight) | Compound 1(7) | Compound 8 (5) | Compound 4(7) | Compound 10(10) | Compound 13(15) | Compound 5(5) and 3(10) | Compound 2(5) and 6(10) | Compound 11(10) and 12(5) |
| Ethanol | 40 | 50 | — | 20 | 45 | 48 | — | — |
| n-Propanol | 43 | 35 | — | — | — | 20 | — | — |
| Propylene glycol monomethyl ether | — | — | 78 | 60 | 30 | — | — | — |
| Benzyl alcohol | — | — | 5 | — | 5 | 5 | 20 | 10 |
| Phenyl grycol | — | — | — | — | — | — | 48 | 50 |
| Polyvinyl pyrrolidone | — | — | — | — | — | — | 5 | 5 |
| Resin (Parts by weight) | Ketone[1] (10) | Sulfoamide[2] (10) | Sulfoamide (10) | Ketone (10) | Ketone (5) | Sulfoamide (12) | Ketone (12) | — |
| Additives (Parts be weight) | — | — | — | — | — | — | — | triethanol amine (5) |
| Stability with time[3] | A | A | A | A | A-B | A | A | A |
| Density of written traces[4] | Good | Good | Good | Good | Fairly good | Good | Good | Good |
| Color phese of ink | Yellow | Brown | Orange | Blue | Black | Red | Red | Blue |

[1] Available from Hitachi Chemical Co., Ltd. as Hilac
[2] Available from Monsant Co., Ltd. as Santolite
[3] Stability with time was determined by placing the ink in Incubator (available from Sanyo Electric Co., Ltd.) in which −5° C. and 50° C. were alternatively repeated for 3 months.
[4] Erasing ability was observed by erasing with an eraser. Very good indicates lightly erasing. Good indicates normally erasing. Fairly good indicates erasable. Bad indicates it is difficult to erase.

Preparation of an ink composition for a writing board marker pen

Example 9

A black ink by mixing at 40° to 45° C. the ingredients shown in Table 2. The obtained ink was set in a marker container and a writing test was conducted using a polypropylene coated white board. The written traces were dried up for 10 to 20 seconds and could be easily cleaned up with a eraser. The stability with time, density of written traces and color phase of the ink are shown in Table 2.

Example 10

A blue ink was prepared by mixing at 40° to 45° C. the ingredients shown in Table 2. The obtained ink was set in a marker container and a writing test was conducted using a polypropylene coated white board. The written traces were dried up for 10 to 20 seconds and could be easily cleaned up with a eraser. The stability with time, density of written traces and color phase of the ink are shown in Table 2.

Comparative Example 1

An ink was prepared from the ingredients shown in Table 2, as generally described in Example 9. The ink was tested as generally described in Example 9 to find that erasing ability is good, but many thin spots were observed with time. The stability with time, density of written traces and color phase of the ink are shown in Table 2.

Comparative Example 1

An ink was prepared from the ingredients shown in Table 2, as generally described in Example 9. The ink was tested as generally described in Example 9 to find that the written traces were not erased easily. The stability with time, density of written traces and color phase of the ink are shown in Table 2.

TABLE 2

| | Examples | | Comparatives | |
|---|---|---|---|---|
| | 9 | 10 | 1 | 2 |
| Dye or pigment | Compound 14 | Compound 9 | Carbon black[6] | Barifast Black #1802[7] |
| (Parts by weight) | (6) | (6) | (6) | (6) |
| Modified alcohol[5] | 86.5 | 84.5 | 86.5 | 86.5 |
| Butyl oleate | 6 | — | 6 | 6 |
| n-Octyl stearate | — | 8 | — | — |
| Cane sugar ester | 1 | 1 | — | 1 |
| Nonionic surfactant[8] | 0.5 | 0.5 | 0.5 | 0.5 |
| Resin (Parts by weight) | — | — | Butyral resin(3) | — |
| Stability with time | A | A | C | A |
| Density of written traces | Fairly good | Good | Good | Fairly good |
| Color phase of ink | Black | Blue | Black | Black |
| Erasing ability[9] | Excellent | Excellent | Excellent | Poor |

[5] Available from Nippon Kasei Co., Ltd. as Solmix A-2
[6] Available from Mitsubishi Chemical Industries Inc. as MA-100
[7] Available from Orient Chemical Industries, LTd.
[8] Available from Daiichi Kogyo Seiyaku Co., Ltd. as Plysurp A-208S

WHAT IS CLAIMED IS

1. An organic solvent based ink composition comprising a dye and an organic solvent, wherein said dye is represented by

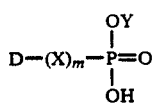

wherein D represents a residue of an azo or anthraquinone dye which does not have a sulfone group and a carboxyl group, X represents an oxygen atom or a methylene group, Y represents a $C_2$-$C_{12}$ alkyl group, a $C_2$-$C_4$ hydroxyalkyl group, a $C_2$-$C_{12}$ alkoxyalkyl group, a polybutyral residue, a polyvinyl alcohol residue, a phenol resin residue, or a cellulose residue and m shows 0 or 1.

2. The organic solvent based ink composition according to claim 1 wherein said dye [I] is obtained by esterifying a dye represented by

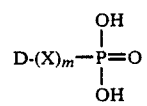

wherein D, X and m are the same as mentioned above, with an alcohol, a glycol monoether, a polybutyral, polyvinyl alcohol, polyphenol resin or a cellulose.

3. The organic solvent based ink composition according to claim 1 wherein said dye [1] is represented by the formulas.

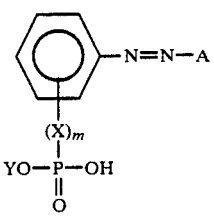

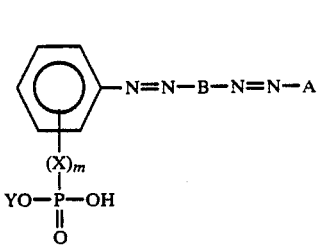

-continued

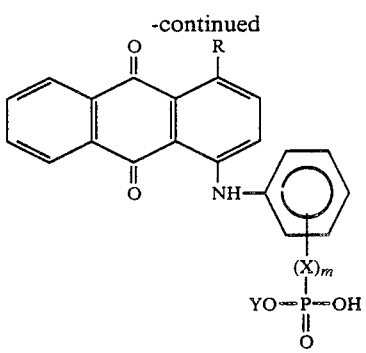

wherein X, Y and m are the same as mentioned above, A represents a residue of a coupling component which does not have a sulfone group or a carboxyl group, B represents a phenylene group or a naphthylene group which may be substituted with a $C_1$-$C_2$ alkyl group, a $C_1$-$C_2$ alkoxy group and/or a hydroxyl group, R represents a hydroxyl group, an amino group or a methylamino group.

4. The organic solvent based ink composition according to claim 1 wherein said dye [1] is present in the ink composition within the range of 8 to 20 % by weight for ball point pens or 3 to 15 % by weight for maker pens.

5. The organic solvent based ink composition according to claim 1 further comprising a binder resin which is dissolved in or compatible with the organic solvent.

6. The organic solvent based ink composition according to claim 1 wherein said organic solvent is a monohydric alcohol, a polyhydric alcohol, a hydroxy ether, an ester of hydroxy ether, formamide, N,N-dimethylformamide, dimethylsulfoxide, N-methyl-2-pyrrolidone or 1,3-dimethyl-2-imidazolidinone.

7. The organic solvent based ink composition according to claim 5 wherein said binder resin includes phenol resin, ketone resin, sulfoamide resin, polyvinylbutyral, polyvinyl alcohol, polyethylene glycol or cellulose resin.

8. The organic solvent based ink composition according to claim 1 further comprising a surfactant, a wetting agent, a viscosity modifier, a pH controller, an anticorrosive agent or a release agent.

9. An ink for a writing utensil for a ball point pen prepared from the ink composition according to claim 1.

* * * * *